(No Model.)
J. W. HYATT.
APPARATUS FOR PURIFYING WATER.
No. 322,104. Patented July 14, 1885.
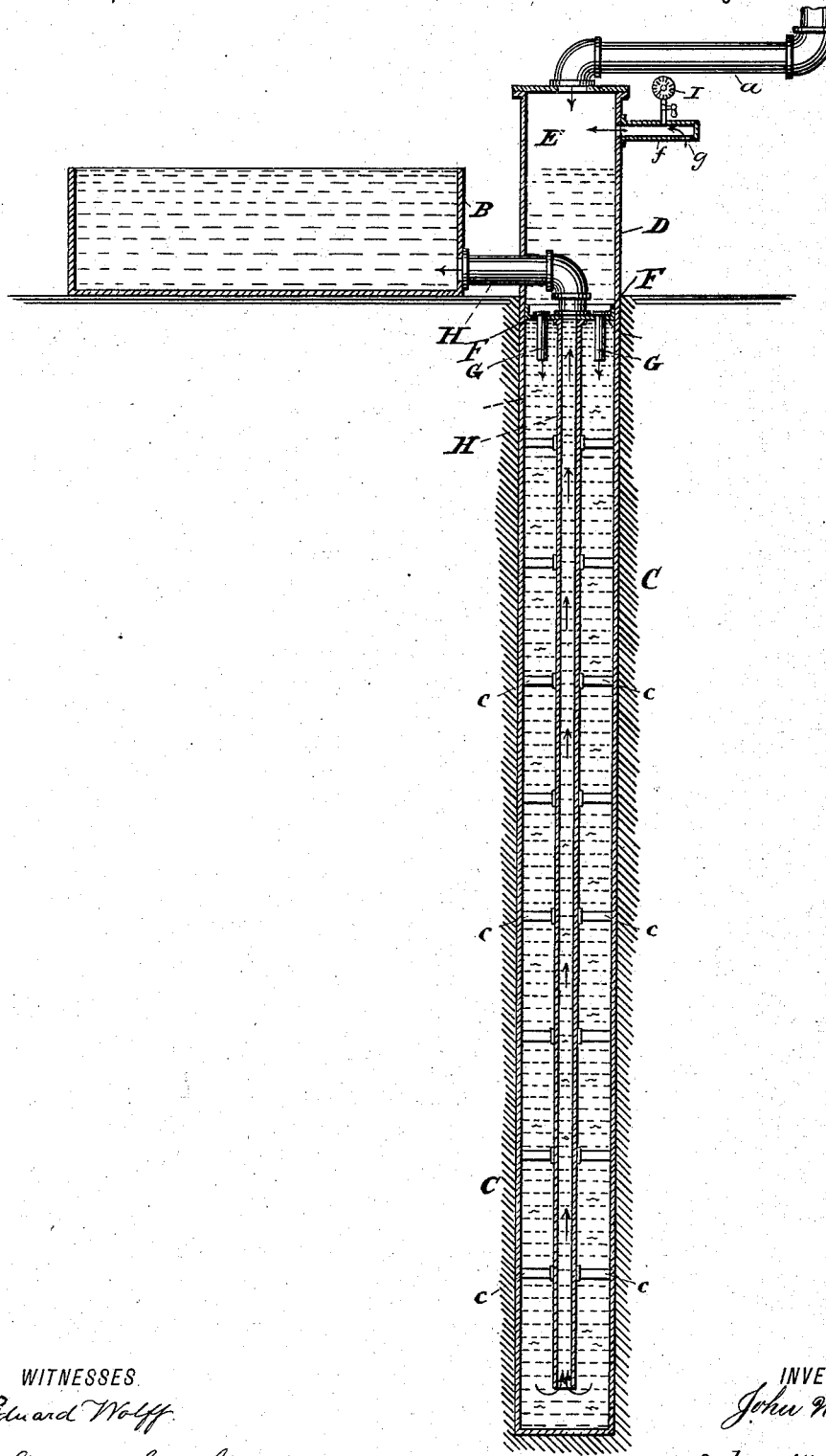
WITNESSES
Edward Wolff
George Cook
INVENTOR
John W. Hyatt
By his Attorney
Rowland Cox

UNITED STATES PATENT OFFICE.

JOHN W. HYATT, OF NEWARK, NEW JERSEY.

APPARATUS FOR PURIFYING WATER.

SPECIFICATION forming part of Letters Patent No. 322,104, dated July 14, 1885.

Application filed May 2, 1885. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Purifying Water, of which the following is a specification.

My invention relates to an improvement in the art of purifying water; and it consists, essentially, in a novel apparatus whereby air may be intimately combined with the water for the purpose of oxidizing the impurities according to well-known principles, and the water then directly passed into the service-pipes of a city or house, or first into a filter, whereby all matter held in suspension is arrested, and then into said service pipes. In an application for Letters Patent filed by me February 26, 1885, No. 157,105, I have shown and described an apparatus for accomplishing the same purpose; but in the present invention it has been my aim to improve the apparatus shown in the aforesaid application by commingling the air and water under great pressure, the same to be effected without the aid of artificial means, and also to construct a device which shall be simple and economical in its construction and at the same time durable and efficient in use.

This invention will be fully described in the detailed description hereinafter presented, reference being had to the accompanying drawing, which represents my improvement in longitudinal section.

A represents the surface of the ground, above which is built a suitable reservoir, B, below which is sunk a deep well or shaft, C, containing the pipe D, both ends of which are closed. Into the upper end of this pipe leads a supply-pipe, *a*, said upper end of the pipe D being formed with a chamber E, by means of the partition F, the edge of which is turned up, forming a flange, whereby it is riveted or bolted to the sides of the pipe D. The plate F is provided with a series of holes or perforations, in which are secured the upper ends of the pipes G, and with a large central opening through which the pipe H passes, the lower end of which latter extends within a short distance of the bottom of the pipe D. The upper portion of the said pipe H, after passing through the side of the pipe D near the upper end of the latter, enters the reservoir B from the under side thereof, as shown in the drawing; or, if desired, the said pipe H may be connected directly with the mains or service-pipes of a city, in which latter case, however, means will be provided for the escapement of the excess of commingled air. To that portion of the pipe H within the pipe D are clamped or otherwise secured the laterally-extending arms *c*, at suitable intervals apart, the outer ends of the arms reaching to the side of the pipe or within close proximity thereto, and serving to agitate the water in its downward course through the pipe D. The water flowing from the supply-pipe enters the chamber E, and, falling on the plate F, passes through the pipes G, taking the air with it, thereby effecting a partial union of the air and water. In order to charge the water flowing into the pipe D with air, I secure to said pipe a pipe, *f*, the outer end of which latter is closed and provided on its under side with an opening, *g*. To the upper side of this pipe I secure a meter, I, of any suitable construction and adapted to register the quantity of air passing into the chamber E through the pipe D. As the water flows through the pipes G it forces the air down through the same, thereby effecting a partial vacuum in the chamber E and pipes *f*, into which the air rushes through the opening *g* and meter I, which air in turn, after entering the chamber E, is also taken up by the water flowing through the pipes G and commingled therewith. It will be readily seen that the air and water are at first commingled under a pressure of one atmosphere; but as they descend to the bottom of the pipe D, which, as before stated, is of great depth, the pressure will be greatly increased, according to the depth of the shaft—as, for instance, a globule of air under a pressure of ten atmospheres will occupy but one-tenth of the space that it originally did on entering the pipe—and in consequence the air and water will be thoroughly commingled, the water absorbing the oxygen of the air, and the impurities in the water thereby consumed or rendered inert. If desired, the reservoir B may be connected with a filter, whereby the impurities in the water which have been rendered inert are arrested prior to the delivery of the water into the service-pipes of the city.

Instead of constructing the apparatus as above described, I might omit the partition from the pipe D and form in the pipe H devices for agitating the water, such as I have shown in an application filed by me on the 26th day of February, 1885, and numbered 157,105. In this case the pipe H, provided with an air-inlet, would be connected with a supply-pipe and the upper end of the pipe D connected to the reservoir. The water would in this case flow down the pipe H, commingling with the air at the same time, and pass out into the shaft or well, whence it would flow to a connecting-pipe into the reservoir. In this case the shaft, being of the same depth, the pressure on the commingled air and water in the bottom thereof would be equal to the pressure on the water in the bottom of the shaft of the apparatus constructed as first described, and hence I do not limit myself to the exact construction shown in the drawing, but hold myself at liberty to make such changes as fairly fall within the scope and spirit of my invention.

It will now be readily seen that by my improved devices I am enabled to aerate a quantity of water under great pressure without the aid of pumps for first elevating the water, as described in the aforesaid application. The water flows from the supply-pipe into the well and enters the reservoir, where the commingled air in excess of the oxygen dissolved by the water escapes, the above operation being effected, as before stated, entirely without the aid of machinery for elevating the water prior to its aeration, and thus materially lessening the initial cost of the apparatus, and also the cost of keeping the same in operation.

I am aware that in the art of filtration air has been combined with the water for the purpose of aerating it. An apparatus for accomplishing this result is illustrated in Letters Patent No. 229,744, granted to Daniel C. Otis on the 6th day of July, 1880. Other patents on filtering apparatus have been issued, in which means have been devised for aerating the liquid; and hence I make no broad claim to such; but, Having fully described my invention, what I claim as new, and desire to secure by Letters Patent, is—

1. An improved device for purifying water, consisting, essentially, of a pipe, D, closed at both ends and sunk below the surface of the ground, and provided with an air-inlet, a supply-pipe leading therein, and a pipe extending down within said pipe D and leading to the outside thereof, substantially as and for the purpose described.

2. An improved device for purifying water, consisting, essentially, of a pipe, D, closed at both ends, sunk below the surface of the ground, and provided with a supply-pipe leading therein, a pipe extending downwardly within the pipe D and connected on the outer side of said pipe D with a reservoir or service pipe, an air-inlet pipe connected with said pipe D, and a meter connected to said air-inlet pipe for the purpose of registering the quantity of air commingled with the water, substantially as set forth.

3. An improved device for purifying water, consisting, essentially, of a pipe, D, closed at both ends and sunk below the surface of the ground and provided with an air-inlet, a supply-pipe leading therein, an exit-pipe extending down within the pipe D and leading to the outside thereof, and means contained in the pipe D for agitating the water in its passage through the same, substantially as set forth.

4. An improved device for purifying water, consisting, essentially, of a pipe, D, sunk below the surface of the ground, and having a chamber, E, formed in its upper end by means of the partition F, a supply-pipe leading into the chamber, an exit-pipe leading from the lower end of the pipe D up through and to the outer side thereof, an air-inlet pipe for supplying air to the chamber, and suitable means for agitating the water within the pipe D, substantially as described.

5. An improved device for purifying water, consisting, essentially, of pipes D H a, of the partition F, pipes G, arms c, and the air-inlet pipe f, the above parts combined and adapted to operate in the manner and for the purpose substantially as set forth.

Signed at New York, in the county of New York and State of New York, this 11th day of April, A. D. 1885.

JOHN W. HYATT.

Witnesses:
GEORGE COOK,
ARTHUR HENTHORN.